(12) United States Patent
Masterson

(10) Patent No.: US 7,278,732 B1
(45) Date of Patent: Oct. 9, 2007

(54) EYEWEAR WITH MOVABLE LENSES HAVING A MAGNIFIED WIDE FIELD OF VIEW

(75) Inventor: Byron J. Masterson, Sarasota, FL (US)

(73) Assignee: Hidden Harbor Group, L.L.C., Sarasota, FL (US)

( * ) Notice: Subject to any disclaimer, the term of this patent is extended or adjusted under 35 U.S.C. 154(b) by 0 days.

(21) Appl. No.: 11/160,959

(22) Filed: Jul. 18, 2005

(51) Int. Cl.
*G02C 9/02* (2006.01)

(52) U.S. Cl. .......................................... 351/59
(58) Field of Classification Search ................... 351/59, 351/60, 61, 41
See application file for complete search history.

(56) References Cited

U.S. PATENT DOCUMENTS

| 2,752,819 | A | * | 7/1956 | Krukowski | .................. | 351/59 |
| 5,561,481 | A | * | 10/1996 | Dileo et al. | ................... | 351/59 |
| 6,746,116 | B1 | * | 6/2004 | Chang | ......................... | 351/59 |

* cited by examiner

*Primary Examiner*—Hung Xuan Dang
(74) *Attorney, Agent, or Firm*—Blackwell Sanders LLP

(57) ABSTRACT

Eyewear is provided having hinged dual lens elements that provide a clear magnified wide field of view, while allowing the option of individually moving one or the other of the lenses away from a frontal viewing position of a particular eye that it covers to a raised position above the eye. The eyewear further enabling a single action to raise one lens and simultaneously lower the other lens.

11 Claims, 4 Drawing Sheets

EYEWEAR WITH MOVABLE LENSES HAVING A MAGNIFIED WIDE FIELD OF VIEW

CROSS-REFERENCE TO RELATED APPLICATIONS

Not Applicable.

BACKGROUND OF THE INVENTION

The present invention relates to eyewear. More specifically, the present invention is directed to eyewear having hinged dual lens elements that provide a clear magnified wide field of view, while allowing the option of individually moving one or the other of the lenses away from a frontal viewing position of a particular eye that it covers to a raised position.

Eyewear is typically worn for a variety of reasons. As such, there exists a wide variety of eyewear types, each of which are specifically designed and intended for a particular use, environment or function. For example, a number of people use "reading glasses" to provide magnification of a subject such as text on a paper or other objects. There are certain activities in which it would be beneficial to have eyewear that provides a clear, magnified, wide field of view when performing other common activities. For example, a typical individual involved in the activity of applying facial makeup or otherwise interacting with their face, who would ordinarily use reading glasses, may have trouble performing such functions with the bare eye or even with a traditional pair of reading glasses.

In particular, when an individual is about to apply makeup to a certain region of the face and especially the area around one eye, it becomes necessary to remove their reading glasses thus recreating the visibility impairment that necessitated the use of the reading glasses in the first place. In another situation, an individual may not be able to view or focus on an image of their face when looking out of the corner of the eye, i.e. the temporal edge of their glasses. In yet another situation, where the individual is attempting to apply makeup to an area around the side burns and/or the ear, the individual would rotate their head in one direction and the eyes in the opposite direction so as to view the area of interest on the face. In this position, the individual also looses the magnification provided by traditional reading glasses and also has to contend with having the glasses/frame obstruct access to regions of the face. Most people who require corrective reading lens are unable to position their face as close as desired to a mirror because they are unable to properly focus on their image from such a position.

Thus, eyewear that provides a clear, magnified, wide field of view that would allow a person to view their image from a close range without encountering problems related to their uncorrected sight limitations is desirable. It is also desirable to have improved visibility even when a person has to apply make-up to an area around the eyes. Ordinarily, a complete loss of visual acuity is encountered when one goes to apply makeup around the eyes because it is usually necessary to remove any corrective eyewear in order to access the area of interest. It is therefore desirable to have a device and/or method that would enable one with impaired vision to have access to apply make up around the eyes without any obstruction or loss of visual acuity. The present invention addresses this need and overcomes the limitations of the prior art.

SUMMARY OF THE INVENTION

To address these and other concerns, the present invention provides, among other things, eyewear that provides a clear, magnified wide field of view with lenses that are movable between a position in front of the eye to a position away from the eye. The eyewear comprises a frame having rims, temples, and a pair of lenses, wherein the temples position the frame about the face of a wearer. The lenses each have a lug with a cam surface located generally around the nose piece. The lugs provide a pivot mount for each lens to the nose piece and have a pivot axis about which the lens may be selectively moved between the position in front of the eye and the position away from the eye, which exposes a region around the eye. The lug is also an inter-engaging portion that provides cooperation between the individual lenses, such that the selective movement of one lens from a frontal position to a raised position or otherwise, cooperatively engages the other lens to move it back to a frontal position. Thereby, only one lens may be raised at a time and a single effort raises one lens while lowering the other.

Even further, the present invention provides for a pivot axis that may be generally normal to the rims and generally parallel to the temples. Alternatively, the pivot axis may be generally parallel to the lens surface and generally perpendicular to the temples.

Further still, the pivot axis of the eyewear may be canted upward or downward to cause a compound motion when a lens is moved. The compound motion is exemplified by the motion of the lens outwardly away from the face of a wearer when the lens is moved about the pivot axis. The movement away from the face of the wearer allows the lens to clear the forehead or other facial features of the wearer.

Other features and advantages of the invention will become apparent to those skilled in the art upon review of the following detailed description and drawings.

BRIEF DESCRIPTION OF THE DRAWINGS

The present invention is further described with reference to the accompanying drawings, which show various constructions and implementations of the present invention. However, it should be noted that the invention as disclosed in the accompanying drawings is illustrated by way of example only. The various elements and combinations of elements described below and illustrated in the drawings can be arranged and organized differently to result in constructions which are still within the spirit and scope of the present invention.

DETAILED DESCRIPTION

The present invention is directed to an eyewear having hinged lenses that provide a magnified wide field of view, while allowing the selective movement of one or another of the lenses between a frontal position and a raised position away from the eye of a wearer. The present invention is described herein with reference to figures that illustrate rotate ably attached lenses having a frame and a bridge. However, the illustrated drawing figures and description herein are provided to describe an embodiment of the present invention and should not be construed to limit or otherwise set forth the scope of the invention.

Figure 1:
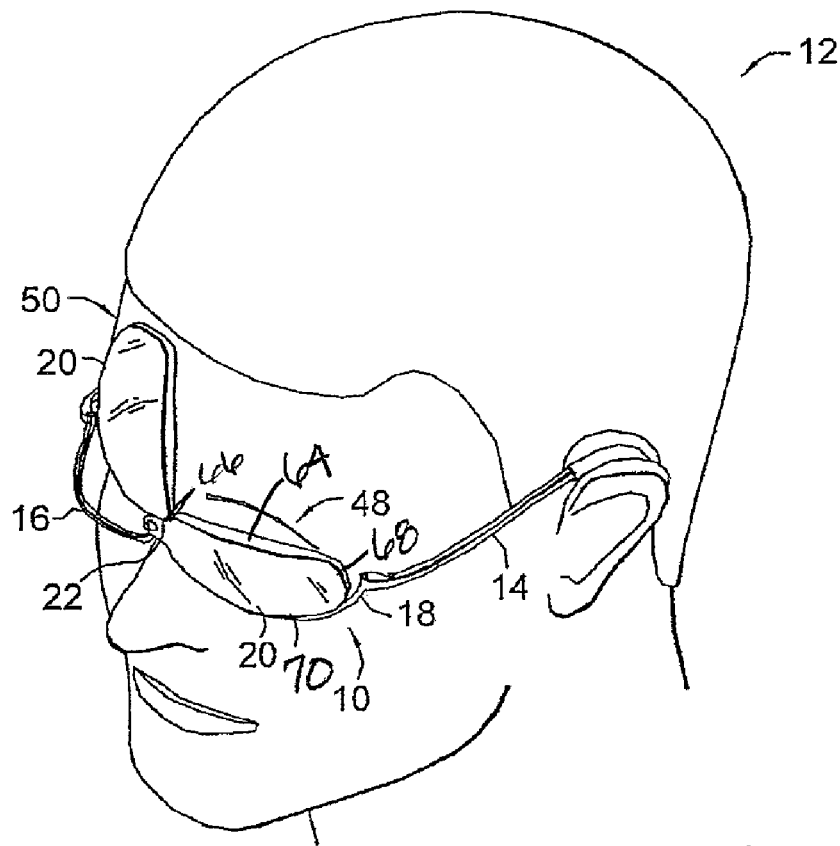
FIG. 1 is an exemplary view of a wearer with an eye wear of the present invention.

Turning initially to FIG. 1, an illustration of an individual wearer 12 with a pair of the eyewear 10 is shown. The eyewear 10 has a frame 18, which includes a left temple 14a and right temple 14b each of which have an ear piece, and support and/or position the eyewear 10 about the face of the wearer 12. Half rims 16 connect the pair of temples 14. In an embodiment of the present invention and as illustrated in the figures, the rims 16 also provide a ledger for a left lens 20a and a right lens 20b, collectively referenced as lens 20. The terms left and right, forward and backward, or other positional descriptions, as used herein are from the perspective of a wearer, and with the eye wear 10 located or positioned as it would ordinarily be worn. Lens 20 has a nasal edge 66, a temporal edge 68, a top cam surface 64, and a rim edge 70. Lens 20 further has a lug 22 with a cam surface, which protrudes from the nasal edge 66 of the lens 20. It would be understood by those skilled in the art that eyewear 10 may not have rims 16, such as when the temples 14 are attached directly to the lens 20. The rims 16 may also be located above the lens 20. Eyewear 10 may also have lenses that are completely surrounded by a metal, plastic or other frame material.

In operation, the lens 20 of the present invention may be selectively moved by the wearer. Specifically, lens 20 may be moved from a frontal position 48 to a raised position 50. The frontal position 48 locates the lens 20 in front of the eye of the wearer 12. The raised position 50 moves the lens away from the eye to expose a region around the eye. In one embodiment, of the present invention the raised position 50 is achieved by pivoting the lens 20 in a direction that is approximately perpendicular to the plane of lens 20. In another embodiment, lens 20 is pivoted in a direction that is proximately in the plane of the lens 20, about an axis that is normal to the plane of lens 20. It would be understood by one skilled in the art that other positions of the lens 20 that will expose a region around the eye are possible and that such positions are attainable by different movements of the lens 20. Such other positions and movement of the lens 20 are contemplated and within the scope of the present invention. The discussion herein is primarily directed to the embodiment of the invention having a pivot axis that is perpendicular to the place of the lens 20.

Figure 2:
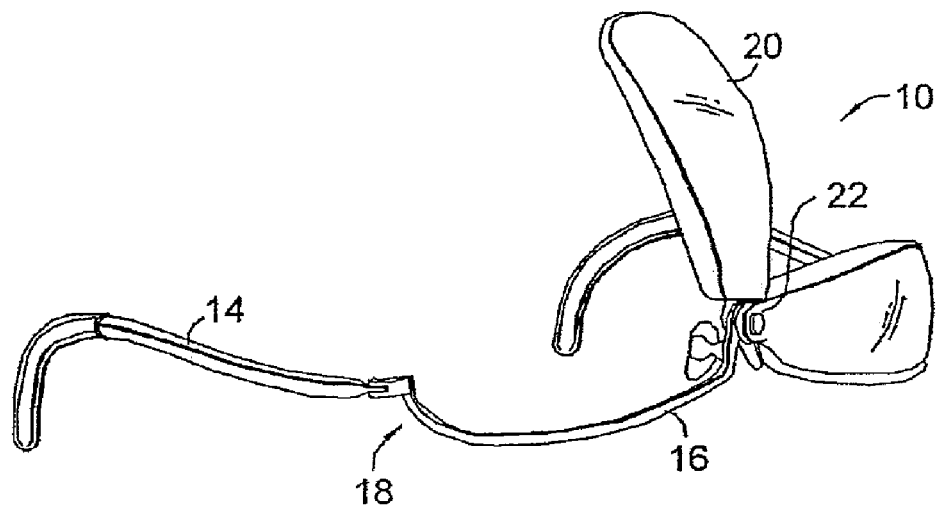
FIG. 2 is on illustrative view of an eye wear of the present invention, having one lens in the raised position.

A lug 22 of each lens 20 is generally located on the nasal edge 66 of the lens 20 and around the nosepiece 24. Lug 22 may be of varying shapes, sizes, or thickness. Lug 22 provides a means to mount or attach the lens 20, such as to nose piece 24 or other pivot mount about which the lens 20, may be pivoted. In an embodiment of the present invention and as illustrated in FIG. 2, the nose piece 24, is adapted to allow a rotational movement of each lens 20. Other adaptations of the nose piece 24 are also contemplated and are within the scope of the present invention.

As shown in FIG. 2, the right lens 20b can be raised by a rotation of the lens 20b about the nose piece 24. The lens 20b remains in the raised position and provides access to the region around the right eye, until lowered by the action of the wearer. The lowering of the lens 20b moves the lens 20b to a frontal position 48 as illustrated in FIG. 3.

Figure 3:
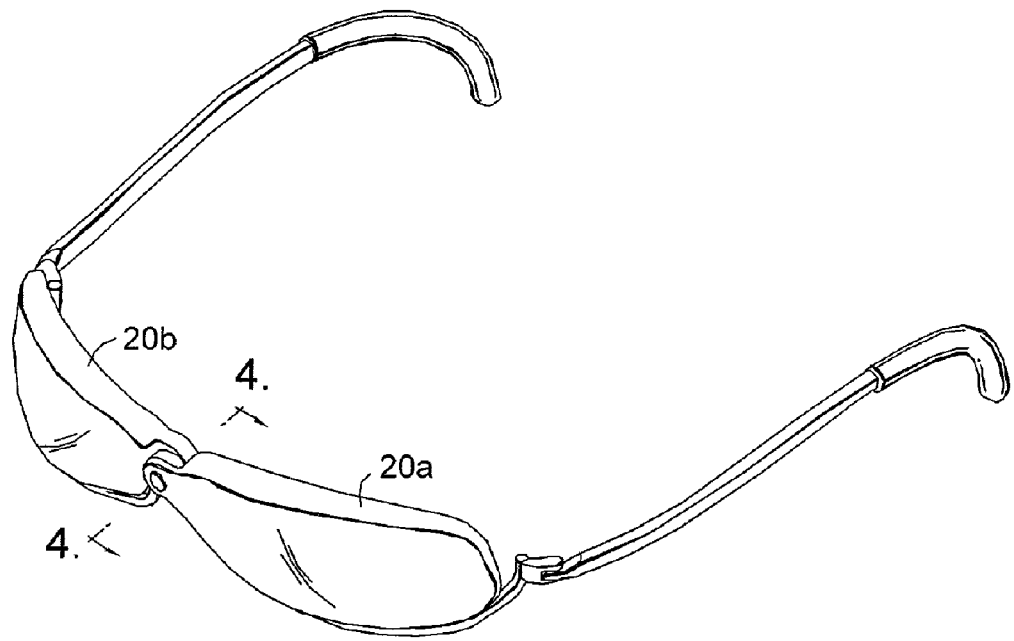
FIG. 3 is a perspective view of the eye wear of FIG. 1 shown with the lenses in a normal or frontal position.

FIG. 3 illustrates a perspective view of eye wear 10 of the present invention, with lens 20a and 20b in a frontal position 48 as normally worn by a wearer 12. The coupling of the lens 20 to the nose piece 24, along with the relative location and position of a pivot axis, enable and dictate the movement of the lens 20 and resting position of the lens 20. To better describe this aspect of the invention, a cross-sectional view of the eye wear 10 of FIG. 3 is illustrated in FIG. 4 and discussed below.

Figure 4:
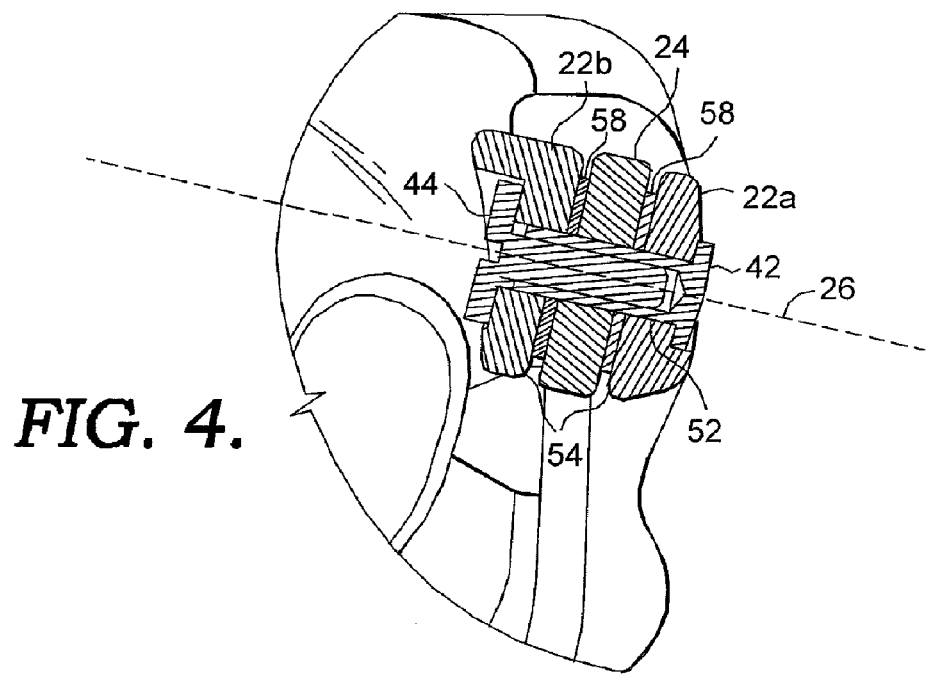
FIG. 4 is a cross sectional view of the pivot-mount area of the eye wear of FIG. 3.

As illustrated in FIG. 4 each lens 20a and 20b is hingedly coupled by lugs 22a and 22b, to the nose piece 24 by a pivot screw 44 and a truss 42. More specifically, the lug 22 of each lens 20 has an ear opening 52 through which the truss 42 and screw 44 are inserted and attached. The ear opening 52 of each lens 20 is aligned with an opening in the nose piece 24 and the lens 20 are arranged such that the nose piece 24 is located between the lugs 22a and 22b of the respective lenses. The truss 42 and pivot screw 44 are then introduced through the aligned opening are securely fastened to align and hold the lens 20 and nose piece 24 in place. To facilitate motion and reduce friction, a pair of washers 58 are located between each lens 20 and the nose piece 24.

The movement of lens 20, relative to the nose piece 24, occurs about a pivot axis 26. Each lens 20 may be selectively moved about the pivot axis 26 into a range of positions. Preferably, then lens 20 are moved to and from a frontal position 48 and a raised position 50. Since the lens 20 of the preferred embodiment is rotateably hinged to the nose piece 24, each lens 20 may be rotatably moved to a desired position. Such rotation is in an upward direction when the lens 20 is moved from the frontal position 48 to the raised position 50.

The pivot axis 26 may be generally horizontal and approximately parallel to the temples 14. In one embodiment of the present invention, the pivot axis 26 is approximately perpendicular to horizontal plane of the temples 14. In the preferred embodiment of the present invention, the nose piece 24 is canted in a forward direction. This results in a pivot axis 26 that is approximately 13° to the horizontal. The movement and ultimate position of lens 20 relative to the face of the wearer 12 or is a function of the cant of the nose piece 24, and the pivot axis 26. The cant of the nose piece 24 facilitates a forward motion of the lens 20. The hinged connection of the lens 20 to the nose piece 24 facilitates rotational movement of the lens 20. The resultant effect of both movements is a compound upward and forward motion of the lens 20 away from the eye and face of the wearer 12 or a downward and backward motion toward the face. This compound motion allows the lens 20 to clear the forehead of a wearer 12 when the lens 20 is moved to the raised position 50.

Figure 5:
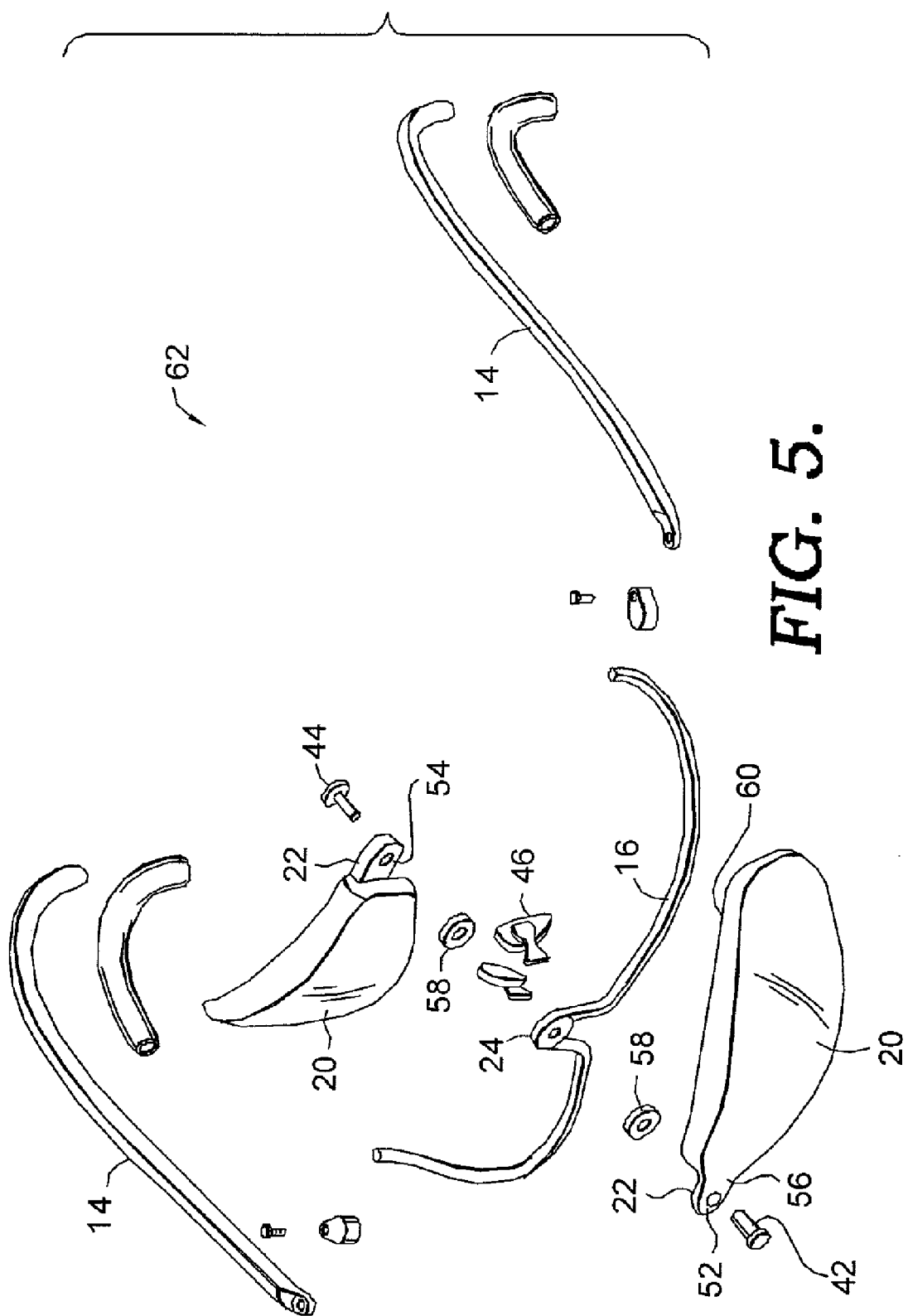
FIG. 5 is an exploded view of an embodiment of the eye wear of the present invention.

The components of one embodiment of eye wear 10 are further illustrated in an exploded view 62, shown in FIG. 5. Temples 14, the left and right elastomers, the temple hinges, temple screw and nose pad shown in FIG. 5, are not a significant part of the invention and thus will not be discussed at length herein. The exploded view of FIG. 5 illustrates the pieces of one embodiment of the eye wear 10 of the present invention. In particular, the details of lug 22 are also further illustrated.

Each lug 22 has a mount contact surface 54 and an opposed surface 56. The mount contact surface 54 is recessed from the lens 26 surface and is essentially flat when assembled. The contact surface 54 contacts a first washer 24 located on one side of the nose piece 24. The opposed surface 56 is uniform with and continuous with the surface of lens 20. The opposed surface 56 contacts a second washer 58 located on the opposite side of the nose piece 24. As shown, one side of lug 22 is beveled to compensate for the cant of the nose piece 24, and to create a substantially uniform contact surface between the mount contact surface 54 of the lug 22 and the washer 58, and ultimately the nose piece 24. The bevel of the lug 22 provides a tapered lug 22. The tapering of the lug 22 orients the lens 20 and places the lens 20 in an approximately vertical viewing plane of a wearer 12. As previously described, the combined geometry of the lug 22 and cant of the nose piece 24 facilitate a compound upward and outward motion, or a downward and inward motion of the lens 20 about the pivot axis 26.

Figure 6:
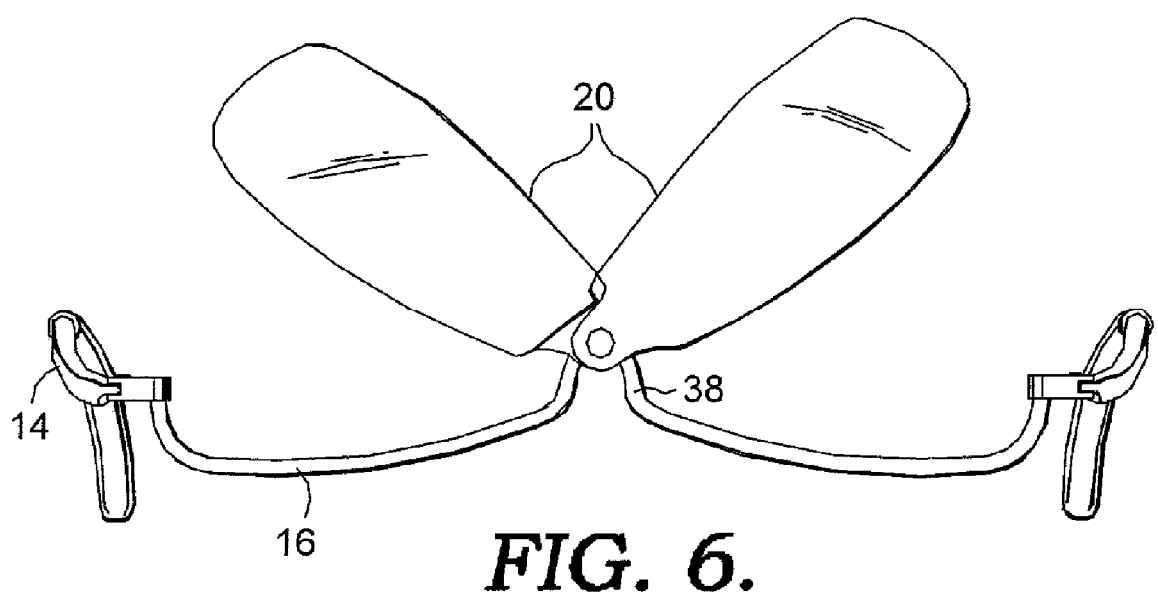
FIG. 6 is an illustrative view of an eye wear having both lenses inter-engaged during a readjustment in which a lowering of a first raised lens occurs when a second lens is being raised by a wearer.

During a raising motion adjustment of left lens 20a when the right lens 20b is already in a raised position 50, the lenses 20a, 20b engage each other as shown in FIG. 6. As shown in FIG. 6, in one embodiment, a notched region 60 proximate to the lug 22 and lens 20, provides an inter-engagement that enables cooperation between the individual lenses 20. For example, the shape and relative position of the lug 22 along with the notched region 60 cause the motion of one lens or both to be arrested when the angle between the cam surfaces 64 of both lenses is less than approximately 90°. Even further, the movement of a first lens 20a to the raised position 50 will move a second lens 20b to the frontal position 48 and vice-versa. In other words, a wearer may move one lens 20 away from the front of the eye, while lowering the other lens 20 in front of the eye in a single action.

When a first lens 20a is raised, the notched region 60 of the first lens 20a contacts and rests upon the notched region 60 of the second lens 20b, whereby lens 20a is supported in the raised position 50. When lens 20a is in the raised position 50 the angle between the cam surfaces 64 of both lenses 20 is such that the center of gravity of the raised lens 20a is shifted from one side of the pivot axis to the opposite side. Specifically, as lens 20a is moved from the frontal position 48 to the raised position 50, the center of gravity of lens 20 shifts along an arc toward and past a position that is perpendicular to the pivot axis. Once the center of gravity of lens 20a is beyond the perpendicular position, the lens 20a naturally falls toward the normally resting frontal positioned lens 20b. The motion of lens 20a is arrested when the notch region 60 of each of the lenses 20 engages the other. At this point, the cornice angle of the lenses is preferably less than 90°. Furthermore, the combination of the mount and the inter-engaging notch regions keep the lens 20a in raised position until moved by the wearer.

As would be understood by one skilled in the art, a variety of geometric relationships between combinations of the lens 20, the nose piece 24, and the pivot axis 26 would also enable such single movement action of the present invention. Even further, the use of a mount manufactured from a material having memory, such as a flexible polymer product, would allow a first lens 20a to be essentially folded in a forward direction. Consistent with the present invention, a subsequent forward movement of a second lens 20b would simultaneously cause the first lens 20a to return to a frontal position.

The constructions described above and illustrated in the drawings are presented by way of example only and are not intended to limit the concepts and principles of the present invention. As such, it will be appreciated by one having ordinary skill in the art that various changes in the elements and their configuration and arrangement are possible without departing from the spirit and scope of the present invention as set forth in the claims.

What is claimed is:

1. Eyewear, comprising:
a frame having rims, a nose piece and temples, wherein said temples position said frame about the face of a wearer; and
a first lens and a second lens, each having a lug, said lugs providing a pivot mount for said lenses to said nose piece, said nose piece having a pivot axis, whereby said lenses may be selectively moved between first positions and second positions about said nose piece, said first positions locating said lenses generally in positions in front of the eyes of said wearer for viewing, and said second positions locating said lenses away from said positions in front of said eyes and exposing regions around said eyes;
wherein said lugs are inter-engaging portions providing cooperation between said first lens and said second lens, whereby a selective movement of said first lens from said first position to said second position cooperatively engages said second lens prior to said first lens reaching said second position to move said second lens from said second position to said first position;
wherein said pivot axis is generally normal to said rims and generally parallel to said temples;
wherein said selective movement is a rotation about said pivot axis; and
wherein said inter-engaging portions arrests the rotation of said first lens from said first position to said second position thereby creating an angle of less than approximately 90 degrees between a top cam surface of each of said first and second lenses, whereby only one lens is in said second position at a time.

2. Eyewear as recited in claim 1, wherein said pivot axis is canted downward about 25 degrees in a forward direction from the horizontal.

3. Eyewear as recited in claim 1, wherein said pivot axis is canted upward having a pivot angle of less than about 90 degrees.

4. Eyewear as recited in claim 1, wherein a pivot angle is formed in a frontal direction between a plane that is generally parallel to a front surface of said lens and said pivot axis, said pivot angle in the range of about X-Y degrees.

5. Eyewear as recited in claim 1 wherein said pivot axis is generally parallel to said lens surface and generally perpendicular to said temples, and wherein a pivot a is formed between a planar surface of said first lens and planar surface of said second lens, said pivot angle in the range of about X-Y degrees.

6. Eyewear as recited in claim 1 further comprising a bias on said lug, wherein said bias and a pivot angle of said pivot axis enable a compound motion when said lens is moved from said first position to said second position, whereby when said lens is moved about said pivot axis said lens also moves outwardly away from the face of said wearer.

7. Eyewear as recited in claim 1, wherein said inter-engaging portion moves said first lens from said second position to said first position, when said second lens is moved from said first to said second position.

8. Eyewear as recited in claim 1, further comprising a frame bridge located generally in the middle of said frame, wherein said lug is rotatably coupled to said frame bridge, whereby said lens is rotatable between said first and said second position.

9. Eyewear as recited in claim 8 wherein said frame bridge is canted and said lug of said lens is beveled to provide an approximately parallel contact surface to said frame bridge, whereby rotation of said lens also moves said lens in a direction of the cant away from a planar surface of the wearers face.

10. Eyewear as recited in claim 9, wherein said frame bridge is canted downward approximately 25 degrees in the forward direction from the horizontal, whereby said lens rotatably pivots both upward and outward to clear the forehead of said wearer.

11. Eyewear, comprising:
a support means for positioning a frame about the face of a wearer;
a lens; and
means for pivoting a first lens and a second lens about a pivot axis, whereby said lenses may be selectively moved between first positions and second positions about said pivot axis, said first positions locating said lenses generally in positions in front of the eyes of said wearer for viewing, and said second positions locating said lenses away from said positions in front of said eyes and exposing regions around said eyes;
an inter-engaging means to provide cooperation between said first lens and said second lens, whereby a selective movement of said first lens from said first position to said second position cooperatively engages said second lens prior to said first lens reaching said second position to move said second lens from said second position to said first position;
wherein said pivot axis is generally normal to said rims and generally parallel to said temples;
wherein said selective movement is a rotation about said pivot axis; and
wherein said inter-engaging portions arrests the rotation of said first lens from said first position to said second position thereby creating an angle of less than approximately 90 degrees between a top cam surface of each of said first and second lenses, whereby only one lens is in said second position at a time.

* * * * *